(12) United States Patent
Lueckenhoff

(10) Patent No.: US 7,260,650 B1
(45) Date of Patent: Aug. 21, 2007

(54) METHOD AND APPARATUS FOR TUNNELING INFORMATION

(75) Inventor: Bruce Arthur Lueckenhoff, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 09/995,920

(22) Filed: Nov. 28, 2001

(51) Int. Cl.
*G06F 15/16* (2006.01)

(52) U.S. Cl. .................. 709/246; 713/151; 713/152

(58) Field of Classification Search ........ 709/245–246; 714/52.4; 713/151–152
See application file for complete search history.

(56) References Cited

U.S. PATENT DOCUMENTS

| | | | | |
|---|---|---|---|---|
| 6,055,236 | A * | 4/2000 | Nessett et al. ............... | 370/389 |
| 6,292,839 | B1 * | 9/2001 | Naudus et al. .............. | 709/238 |
| 6,321,268 | B1 * | 11/2001 | Dillon et al. | |
| 6,496,867 | B1 * | 12/2002 | Beser et al. ................. | 709/245 |
| 6,523,068 | B1 * | 2/2003 | Beser et al. ................. | 709/238 |
| 6,557,037 | B1 * | 4/2003 | Provino ........................ | 709/227 |
| 6,675,225 | B1 * | 1/2004 | Genty et al. ................. | 709/245 |
| 6,697,871 | B1 * | 2/2004 | Hansen ........................ | 709/234 |
| 6,735,206 | B1 * | 5/2004 | Oki et al. | |
| 6,882,654 | B1 * | 4/2005 | Nelson | |
| 6,931,529 | B2 * | 8/2005 | Kunzinger | |
| 7,006,526 | B1 * | 2/2006 | Biederman | |
| 7,080,138 | B1 * | 7/2006 | Baker et al. | |
| 2001/0042201 | A1 * | 11/2001 | Yamaguchi et al. ........ | 713/151 |
| 2001/0047474 | A1 * | 11/2001 | Takagi et al. | |
| 2002/0032798 | A1 * | 3/2002 | Xu | |
| 2002/0042875 | A1 * | 4/2002 | Shukla ........................ | 713/151 |
| 2002/0114274 | A1 * | 8/2002 | Sturges et al. .............. | 370/229 |
| 2002/0116532 | A1 * | 8/2002 | Berg | |
| 2003/0051053 | A1 * | 3/2003 | Vasko et al. | |
| 2003/0061338 | A1 * | 3/2003 | Stelliga ....................... | 709/224 |
| 2003/0074461 | A1 * | 4/2003 | Kang et al. ................. | 709/230 |

* cited by examiner

*Primary Examiner*—Bunjob Jaroenchonwanit
*Assistant Examiner*—Duyen Doan
(74) *Attorney, Agent, or Firm*—Chapin IP Law, LLC; Barry W. Chapin, Esq.

(57) ABSTRACT

The invention is directed to techniques and mechanisms, used in a beginning tunneling device, for detecting an initial request, identifying the initial request as a candidate to be a tunneling request, modifying at least one indicator of an initial header in the initial request to convert the initial request into the tunneling request, and forwarding the tunneling request towards an end tunneling device. The invention is also directed to techniques and mechanisms in an end tunneling device for detecting a tunneling request, identifying the tunneling request as a candidate to be an initial request, modifying at least one indicator of a tunneling header in the tunneling request to convert the tunneling request into the initial request, and forwarding the initial request towards a destination device. The embodiments of the invention add little or no packet overhead.

24 Claims, 7 Drawing Sheets

METHOD AND APPARATUS FOR TUNNELING INFORMATION

BACKGROUND OF THE INVENTION

Computer networking involves an intricate, rapidly evolving complex of software and hardware systems, integrating different methodologies, techniques, processes, and protocols together. Various protocols provide standard methods which allow for communications between different components of such heterogeneous network systems. Network protocols have different operating characteristics. For example, UDP (user datagram protocol) is well suited to transporting certain multi-media files, Transmission Control Protocol (TCP) provides additional functions that ensure reliable transport of data to an intended destination, etc. Sometimes protocols are replaced with new versions of the protocols that can provide feature and operating characteristic enhancements. For example, version six of the Internet Protocol (IP) provides enhanced addressing and other features not available from earlier versions of the protocol.

In order to accommodate different methods of operations and operating characteristics of different protocols, network designers sometimes employ a technique called tunneling. Tunneling is a method for transporting packets of data conforming to a first particular protocol over a network using a second protocol by packaging or encapsulating packets of the first protocol within other packets using the second protocol. A conventional data communications device that tunnels packets treats the packet to be tunneled as a payload or data and encapsulates this entire packet including the original packet header with an additional packet header. Designers may use tunneling in order to allow networks that are already in existence but that use different protocols to transport the "tunneled" packets containing the protocol that those networks do not support.

Companies providing network infrastructure(s) used to transmit Internet and other traffic have developed various techniques to manipulate data transmission, including traffic management techniques, web and network caching, etc. Tunneling can sometimes be employed to inhibit such manipulation by insulating packets containing data and protocol information within other packets of a different protocol.

SUMMARY

Unfortunately, there are shortcomings to conventional tunneling methodologies. One such shortcoming involves an issue called fragmentation. Conventional Tunneling Network protocols incur fragmentation when a packet size of a data transmission to be tunneled is equal to the maximum packet size of the transmission channel available. Since the original packet to be tunneled is already at the maximum packet size for the network, the original packet must be broken up or fragmented to make room for the new tunnel packet header. In other words, when fragmentation occurs, the network facility will break up a large complete original packet into multiple smaller packets and transmit the individual packets to the original destination device. Then the destination network device reassembles the segments back into the original packet at the end of the tunnel. The resulting additional processing represents an increase in overhead.

In some cases the maximum transmission units (MTU's) (e.g., the transmission capacity) of any particular hop can be increased in size. However, at other times the MTU limitation is related to the capacity of the equipment in place which is not able to be expanded. Any increase in the size of packets increases the likelihood that fragmentation may become necessary. When fragmentation occurs, multiple segments of a packet, each having individual headers, must be transmitted. The result is an increase of the information that must be transmitted due to overhead. As a consequence, transmission of tunneled packets, when the packets are fragmented, requires greater bandwidth to transmit the original data.

In addition to an increase in the use of bandwidth due to fragmentation, the occurrence of fragmentation consumes additional processing resources at both the originating and receiving ends of network hops. This additional processing overhead results from the need to break-up packets and add additional new headers at the originating device and the need to eliminate headers and re-constitute fragmented segments into the original packet and notify the originating device of lost segments, if necessary, etc. at the receiving device.

An additional problem, related to fragmentation, is that a time limit may be enforced at the receiving device for reception of all packet needed to re-assemble any particular original packet into to its originally-transmitted form. The time limit ensures that, under conditions of high traffic or compromised transmission, that the receiving device ultimately receives the full complement of segments needed for re-assembly of the segments into the originally-transmitted packet within a predetermined time period. In the event of a failure to receive the complete series of packets needed to re-assemble an original, the receiving device sends a message back to the originating device as notification that one or more fragmented packets must be re-sent. In high traffic situations, packet loss due to timing-out while waiting for the reception of packet fragments can be problematic, resulting in a further reduction of effective bandwidth. Also, in situations requiring real-time data transfer, the extra overhead incurred from the use of conventional tunneling techniques can make real-time tunneling difficult if not impossible.

Embodiments of the invention are directed to techniques and mechanisms for transmission of content using an improved method of tunneling (e.g., tunneling of packets, etc.). The embodiments of the invention enable tunneling by modifying an initial request instead of encapsulating initial requests within even larger request packets. Unlike the conventional techniques and mechanisms for tunneling, the resulting tunneling request and data maintain their original size. Thus, there is no increase in the likelihood of fragmentation caused by tunneling and fragmentation need not occur at all. Accordingly, the embodiments of the invention permit tunneling without wasting additional bandwidth or adding overhead. A further advantage of the embodiments of the invention is that tunneling can be achieved without increasing the likelihood of discarded or re-transmitted segments that may occur due to packet segmentation and the further reduction of transmission capacity. Accordingly, the advantages of tunneling are possible without diminishing transmission capacity or expanding network facilities.

In order to perform the tunneling, in one embodiment of the invention, a beginning tunneling device (e.g., a computer system, network or data communications device, switch, router, etc.) receives an initial request (e.g., a packet, communications message, etc.) from an originating device (e.g., a user computer or other computer system, network device, etc.). Upon receipt of the initial request, the beginning tunneling device first identifies the initial request as a tunneling request, then modifies an indicator of the existing initial header (such as an IP, UDP, or other header) of the initial request. No additional header or processing of an additional header is required.

In particular, in one embodiment, the beginning tunneling device replaces the IP protocol number in the initial header to indicate that the initial request has become a tunneling request. The beginning tunneling device also replaces the initial request's destination address (e.g., the address of the device which is the ultimate destination of the original request) with the address of the end tunneling device. In one embodiment of the invention, the fragment ID (e.g., other fields may be used in different embodiments of the invention) may be used to either store the destination address, or, as in the case of multiple destinations, the fragment ID can be used to store a code or indicator that can be converted by the end tunneling device to the address of the destination device. The beginning tunneling device can also recalculate an error correction code (e.g., IP checksum) of the initial header to reflect the changes made to the contents of the initial header. The beginning tunneling device can then forward the tunneling request (e.g., converted from the initial request) to the end tunneling device.

A significant advantage of the embodiments of the invention is a reduction of the processing resources that would otherwise be necessary using conventional tunneling. In addition to modifying fields and re-calculating an error correction code, as described in the steps above, conventional methods of tunneling require the management and calculation of packet sizes necessary to fit existing packets into the packets into which they are encapsulated, creation of new packets, assembly, disassembly, etc. Such tasks are significantly reduced or avoided all together according the embodiments of the invention, thereby achieving tunneling with lower consumption of system resources and little or no additional overhead.

Once the tunneling request is received at the end tunneling device, the end tunneling device converts the tunneling request back to the initial request. The end tunneling device can change the protocol number back to the original protocol number or to a protocol number for the protocol being used in the next hop of the network. The end tunneling device can also change the destination address field of the tunneling header to the actual destination (e.g., or an address of an intermediate destination if the tunneling request is traveling through multiple hops) of the tunneling request (e.g., now converted back to the initial request). The end tunneling device can also re-calculate the error correction code (e.g., IP checksum) reflecting the changes made to the contents of the header as the tunneling header is converted back to an initial header.

As discussed previously, different options are available for obtaining or identifying the address of a destination device in a tunneling header, as used in different embodiments of the invention. One embodiment uses the fragment offset field to store a code which can be translated to one of multiple different destination addresses. Another embodiment uses the fragment offset field or a different field as a flag to indicate that the originating device and destination device should use some other source of information (e.g., such as a different field in the header or an options or padding field, or a static table maintained independently of the tunneling header, or some other field or source of information) for converting the end tunneling destination address stored in the destination address field of the tunneling header into an actual destination address. Upon reception at the end tunneling device, the end tunneling device forwards the initial request (e.g., initial request which is converted back from the tunneling request) to the destination device.

In one embodiment, a beginning tunneling device detects an initial request, identifies the initial request as a candidate to be a tunneling request, modifies at least one indicator of an initial header in the initial request to convert the initial request into the tunneling request and forwards the tunneling request towards an end tunneling device. The initial request is thereby converted to a tunneling request and forwarded along a tunneling path in the network.

In another embodiment, the beginning tunneling device detects that a destination address in the initial request is for a destination device associated with an end tunneling device. The destination address is then used, by components of the network to direct the tunneling request along a path to the end tunneling device.

In yet another embodiment, the beginning tunneling device sets a protocol indicator in the initial header to a value indicating that the initial request is a tunneling request. The protocol indicator thus identifies the initial request as now being a tunneling device.

In another embodiment, the beginning tunneling device replaces a destination address of a destination device in the initial header with an end tunneling address of an end tunneling device to produce a tunneling header. Accordingly, tunneling requests can be directed to any of multiple destinations associated with the end tunneling device.

In another embodiment, the beginning tunneling device specifies a destination code within the tunneling header for at least one of a plurality of destination addresses of destination devices served by the end tunneling device.

In another embodiment, the initial request received by the beginning tunneling device is in the format of a TCP/IP protocol, the beginning tunneling device generates a destination code to designate a destination address served by the end tunneling device and the beginning tunneling device stores the destination code in a fragment offset field of an IP header of the tunneling request. The fragment offset field is one of the header fields of a IP protocol header.

In still another embodiment, the beginning tunneling device sets an error correction code in the tunneling header to reflect modifications made to convert the initial tunneling header into a tunneling header. Accordingly, the embodiment of the invention maintains operation of the error correction process.

In another embodiment, the beginning tunneling device sets a protocol indicator in the initial header to a value indicating that the initial request is a tunneling request, replaces a destination address in the initial header with an address of an end tunneling device and sets an error correction code in the tunneling header to reflect modifications made to the initial header.

In another embodiment, the initial request and the tunneling request are the same size. The embodiments of the invention allow for tunneling with minimal additional overhead.

In yet another embodiment, the initial and tunneling request include respective initial and tunneling headers of the same size.

In another embodiment, the initial request is a full initial request and the full initial request can be fully converted into a single tunneling request. Thus, the tunneling request is not limited by the content of initial request.

In another embodiment, an end tunneling device detects a tunneling request, identifies the tunneling request as a candidate to be an initial request, modifies at least one indicator of a tunneling header in the tunneling request to convert the tunneling request into the initial request and forwards the initial request towards a destination device.

In still another embodiment, the end tunneling device sets a protocol indicator obtained from the tunneling header to a value to convert the tunneling request to an initial request. Accordingly, the request is converted back to the initial request for continued transmission over the network.

In another embodiment, the end tunneling device replaces an end tunneling address of the end tunneling device in the tunneling header with a destination address to produce an initial header.

In yet another embodiment, the end tunneling device obtains a destination code within the tunneling header for at least one of a plurality of destination addresses of destination devices served by the end tunneling device wherein the destination address used in the step of replacing is determined by the destination code. Thus, the destination code is used as a reference to a destination address of the initial header. Upon conversion of the tunneling request back to an initial request, at the end tunneling device, the tunneling request may be forwarded to one of multiple destination address locations referred to by a destination code.

In another embodiment, the tunneling request received by the end tunneling device is in the format of a TCP/IP protocol and the end tunneling device reads a destination code from a fragment offset field of an IP header of the tunneling request and from the destination code, ascertains the destination address served by the end tunneling device. From the end tunneling device, an initial request, converted back from a tunneling request, can now be forwarded over the network to a destination address associated with the end tunneling device. The destination code, stored in the fragment offset field can point to one of multiple possible destinations.

In yet another embodiment, the end tunneling device sets an error correction code in the initial header to reflect modifications made to convert the tunneling header to the initial header.

In still another embodiment, the tunneling request received by the end tunneling device is in the format of a TCP/IP protocol and the end tunneling device sets a protocol indicator obtained from the tunneling header to a value to convert the tunneling request to an initial request, replaces an address of the end tunneling device in the tunneling header with destination address to produce an initial header and sets an error correction code in an initial header to reflect modifications made to the tunneling header.

In another embodiment, the tunneling device detects a first request, identifies the first request as being associated with a tunneling operation, converts the first request to a second request for use in the tunneling operation, wherein the first and second request are the same size, then forwards the second request towards a destination.

In yet another embodiment, the first and second request include respective first and second headers of the same size.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for identifying and transmitting tunneling requests, such as one or more packets by modifying the initial header of an initial request in order to change the initial request into a tunneling request. No creation or processing of additional headers or encapsulation of packets within other packets or headers is involved. In order to perform the tunneling, in one embodiment of the invention, a beginning tunneling device (e.g., a computer system, network device, switch, router, etc.) receives an initial request (e.g., a packet, communications message, etc.) from an originating device (e.g., a user computer or other network devices, etc.). Upon receipt of the initial request, the beginning tunneling device first identifies the initial request as a tunneling request, then modifies the initial header to create a tunneling header.

To do so, the beginning tunneling device replaces the IP protocol number indicating that the initial request has become a tunneling request. Next the tunneling device replaces the initial request's destination address with the address of the end tunneling device. In one embodiment of the invention, the beginning tunneling device stores the destination address as a code in the fragment ID or other field of the tunneling header. In other embodiments of the invention, the beginning tunneling device stores a reference or pointer in the fragment ID or another field of the tunneling header that can be used in conjunction with a table or other facility to identify the actual destination address from potentially multiple destinations. Finally, the beginning tunneling device recalculates the error correction code (e.g., IP checksum) of the initial header to reflect the changes made to the contents of the initial header. At this point the beginning tunneling device forwards the tunneling request (e.g., converted from the initial request) to an end tunneling device.

Upon receipt of the tunneling request, by the end tunneling device, the end tunneling device reverses the process described above to convert the tunneling request back to the initial request.

Upon reception at the end tunneling device, the end tunneling device forwards the initial request (e.g., the initial request that was converted back from the tunneling request) to the destination device. Since embodiments of the invention perform tunneling by modifying fields in the original or initial header and do not add an additional header, the tunneled request (e.g., packet) is the same size (e.g., number of bytes) as the initial request and thus, fragmentation is avoided altogether. Little or no overhead is added as would result from encapsulating packets within other packets (also having headers).

Figure 1:
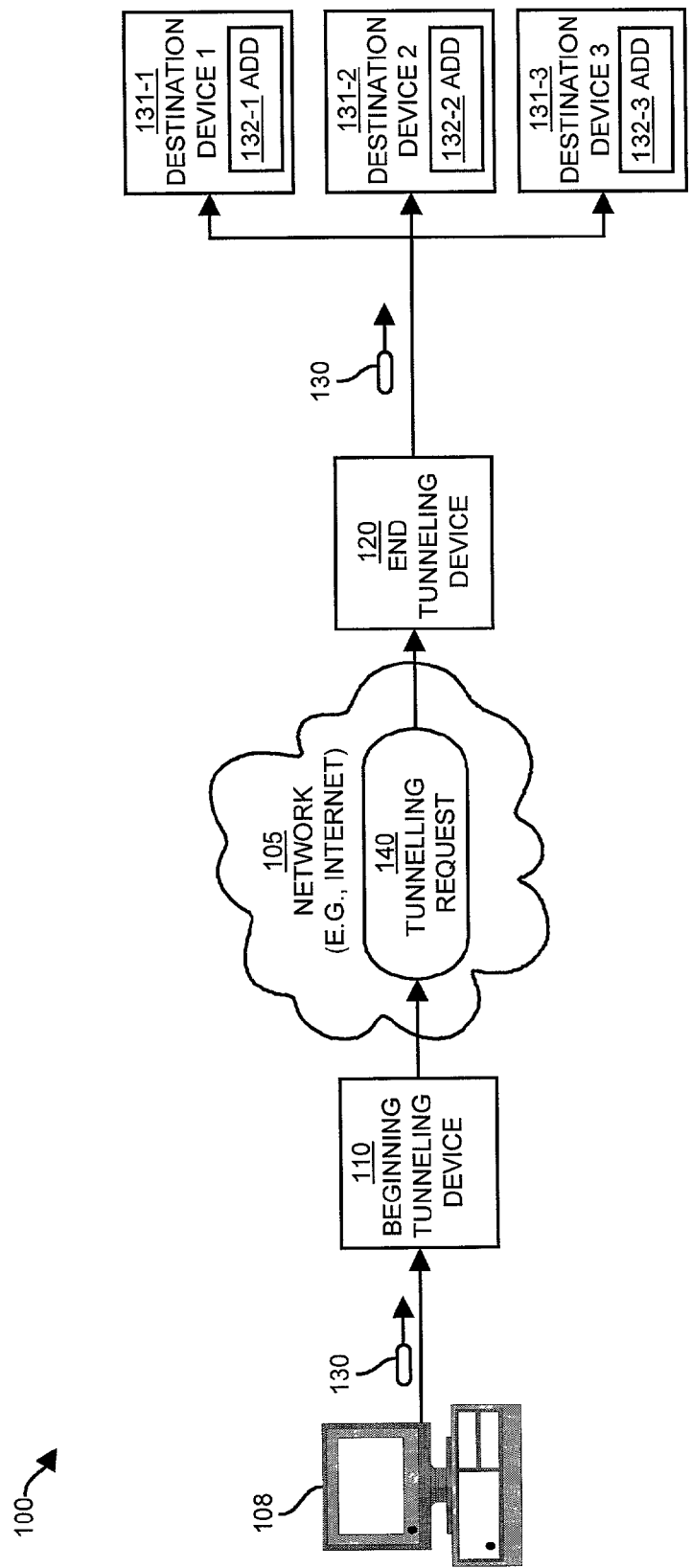
FIG. 1 shows a communications system 100 with components that are suitable for use by the invention.

FIG. 1 shows an example communications system 100 with components that are suitable for use by the invention. The system 100 includes an originating device 108, a beginning tunneling device 110, a network 105, an end tunneling device 120, and one or more destination devices 131-1, 131-2, 131-3, etc. The originating device 108 may be a user computer such as a personal computer or other system like a minicomputer, mainframe etc. The beginning tunneling device 110 may be a computer system, a router, bridge, gateway, switch or other network or data communications device, etc. A beginning tunneling device 110 may be one component of a network 105, as described below.

The network 105 (e.g., the Internet) may consist of various data communications devices such as routers, bridges, switches, access servers, gateways, hubs, concentrators, proxy servers, repeaters and so forth which exchange data over an interconnection of data links. These may be physical connections or may also be provided using wireless communication mechanisms. Physical data communications connection mechanisms can include modems, transceivers, network interface cards, fiber optic cards, ports and other hardware devices and many others which allow data to be transferred at various data transfer rates (i.e., bandwidth) such as T1, T1, E1 or other rates.

The network 105 may have one or more beginning tunneling devices 110 and end tunneling devices 120. An end tunneling device 120 may be a computer system, a router, bridge, gateway, switch or other network device, etc.

A beginning tunneling device is configured to convert an initial request 130 into a tunneling request 140 which is then forwarded to an end tunneling device 120. Upon reception of the tunneling request 140, the end tunneling device 120 converts the tunneling request 140 back into an initial request 130. At that point, the end tunneling device 120 can forward the initial request 130 to any of one or more destination devices 131-1, 131-2, 131-3, etc. Three different destination devices are shown here for ease of describing the invention. It should be understood that any number of destination devices are possible. These will be collectively referred to as destination devices 131, herein.

By performing the procedure, thus described, the components of the system 100 are able to tunnel an initial request 130 to a destination device 131 without increasing the request (e.g., the packet, message, etc.) size.

Figure 2:
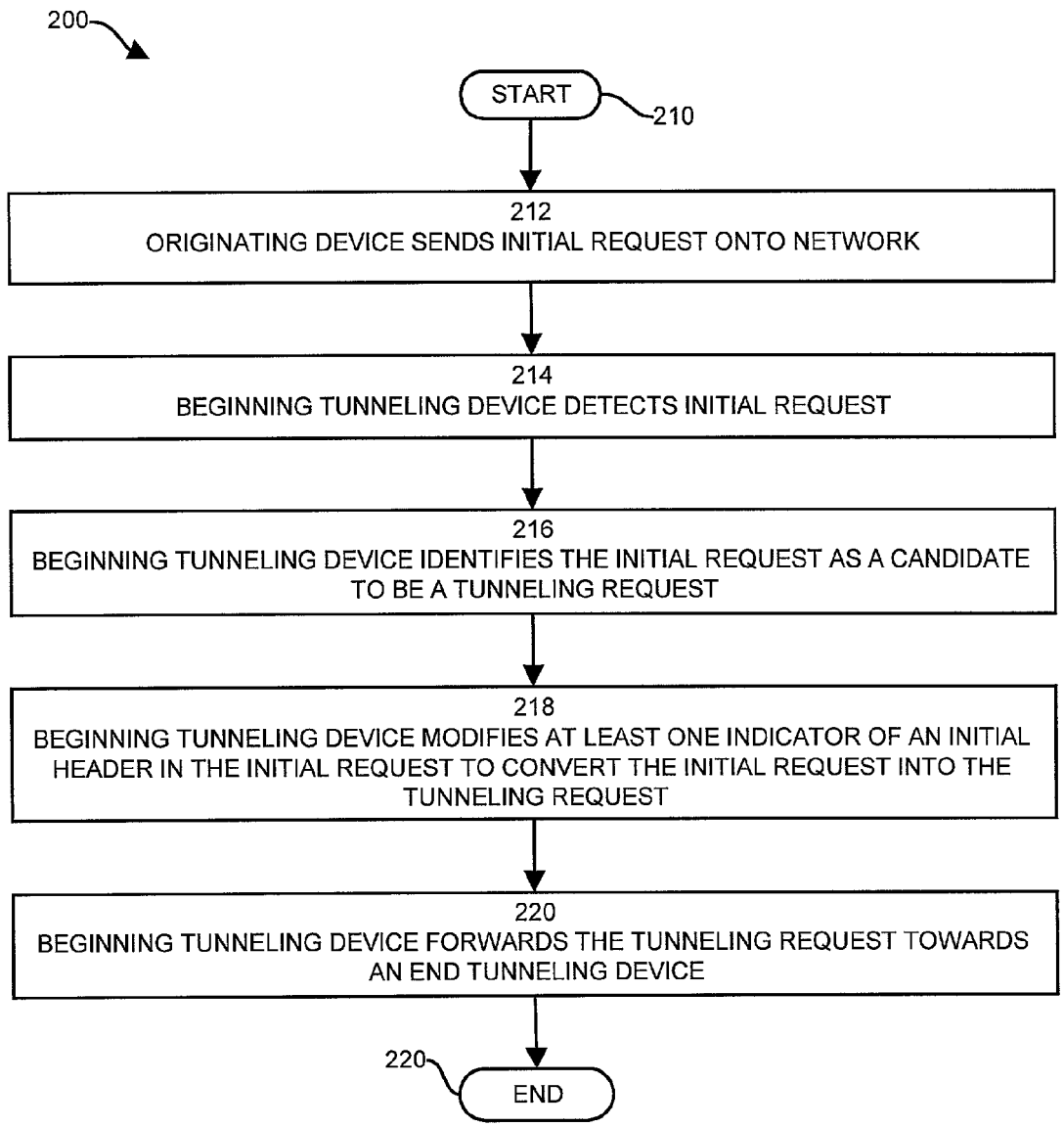
FIG. 2 is a flow chart of procedure 200 performed by the originating device and beginning tunneling device.

Further details of the invention will now be provide with reference to FIG. 2.

FIG. 2 is a flow chart of a procedure performed by the originating device (e.g., the requesting device) and beginning tunneling device 110.

In step 212, the originating device 108 sends an initial request 130 to the network 105.

For example, the designers of a device, communicating data, over a system using the TCP/IP protocol may be interested in transmitting the data using tunneled IP packets over one portion of the network 105. The designers may do so for the purpose of providing additional security for the data transmission, insulating the transmitted packets from undesirable processing at intermediate nodes of the network, or some other reason, etc.

In step 214 the beginning tunneling device 110 detects the initial request 130 sent from the originating device 108.

In step 216 the begin tunneling device 110 identifies the initial request 130 as a candidate to be a tunneling request 140. This part of the procedure may be accomplished in a variety of ways. For example, the tunneling device 110 may be configured in such a manner as to a identify any initial request 130 (e.g., packets, messages, etc.) received that has a particular source address (e.g., IP address, etc.) as being designated to become tunneling requests 140.

In another example, the beginning tunneling device 110 may interpret information from an initial header (See FIG. 4, 200) in order to identify that the initial request 130 is intended to be a tunneling request 140. Such information may have been placed in the header or data of the initial request 130 for unrelated purposes (e.g., the information in the header or data may be used to specify the type of data being transmitted, the protocol being used, the age of the data packet, or any of numerous other transmission-related objectives, etc.) or, the initial request 130 may be specifically encoded by the originating device 108 in order to identify the fact that the initial requests 130 are candidates to become tunneling requests 140.

In another example, both the originating device 108 and beginning tunneling device 110 may be integrated into a combined unit. In that case, the combination originating device 108 and beginning tunneling device 110 immediately generates the tunneling request 140 then transmits the tunneling request to the end tunneling device 120. Various other configuration are possible for identifying initial requests 130 which are candidates to be tunneling requests 140 as would be known by individuals with ordinary skill in the art.

Thus, the destination code is used as a reference to a destination address of the initial header. Upon conversion of the tunneling request back to an initial request, at the end tunneling device, the tunneling request may be forwarded to one of multiple destination address locations referred to by a destination code.

In step 218, the beginning tunneling device 110 modifies at least one indicator (e.g., the protocol number 276 of the initial header 200, such as an IP header, another field of the initial header 200 or other indicator) of an initial header 200 in the initial request 130 to convert the initial request 130 into the tunneling request. The protocol number 276 identifies the fact that the initial request 130 has become a tunneling request 140. Accordingly, the components of the network 105, as well as the end tunneling device 120 can treat the tunneling request 140 accordingly.

In step 220, the beginning tunneling device 110 forwards the tunneling request towards an end tunneling device 120.

Further details of the procedure for converting an initial request 130 to a tunneling request 140 by the beginning tunneling device 110 will be provided later with reference to FIG. 5. Further details of the invention will now be provided with reference to FIG. 3.

Figure 3:
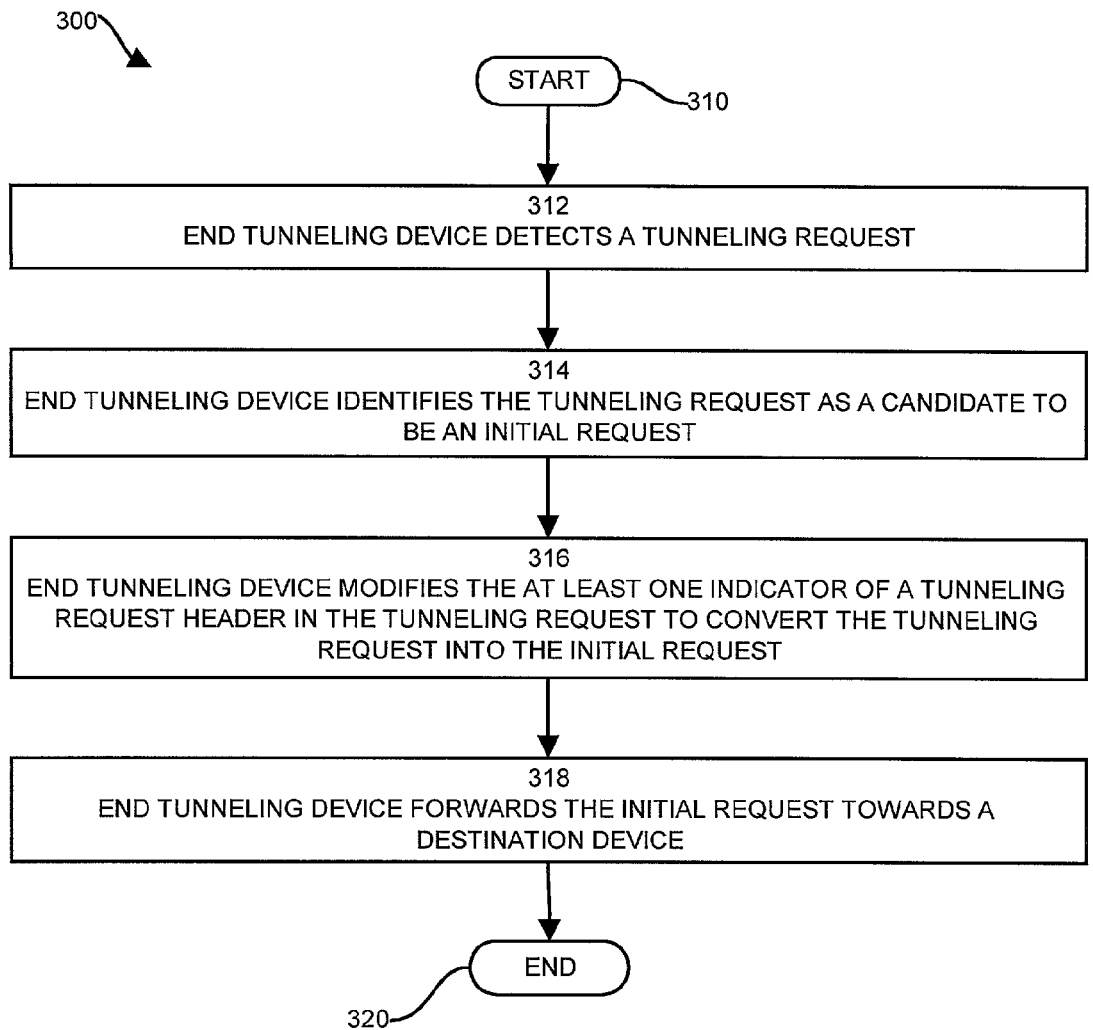
FIG. 3 is a flow chart of a procedure 300 performed by end tunneling device according to one embodiment of the invention.

FIG. 3 is a flow chart of a procedure 300 performed by the end tunneling device 120 according to one embodiment of the invention.

In step 312, the end tunneling device 120 detects a tunneling request 140. Tunneling requests 140 are routed over the network 105 in the same fashion as other requests. That is, devices within the network 105 are configured to route initial requests 130, tunneling requests 140, as well as all other requests, from point to point along a route, forwarding the requests from each node in the network 105 to other designated nodes which transport the requests to their intended destination using standard routing techniques. Upon receipt of any such request (e.g., initial request 200, tunneling request 300, and other request, etc.) at any node of the network 105, the network 105 node reads and interprets the request header contents in order to identify how and to where the node should forward the request.

In step 314, the end tunneling device 120 identifies the tunneling request 140 as a candidate to be changed back to an initial request 130. As described earlier, in one embodiment of the invention, the end tunneling device 120 is able to identify an end tunneling request 140 by reading a protocol field (e.g., FIG. 4, 376) designating the request as an end tunneling request 140. Other methods of identifying a tunneling request 140 are also possible, as were described earlier, with reference to identifying or designating initial requests 130.

In step 316, the end tunneling device 120 modifies at least one indicator (e.g., the protocol number, See FIG. 4, 376) of a tunneling header (e.g., IP header, See FIG. 4, 300) in the tunneling request 140 to convert the tunneling request 140 back into the initial request 130. For example, the end tunneling device 120 can replace the protocol number 376 indicating a tunneling request 140, in the tunneling header (e.g., the IP header), with the protocol number 376 (e.g., protocol number 17, user datagram protocol) that indicates an initial request 130. Further details of the end tunneling device 120 procedure for converting a tunneling request 140 back to an initial request 130 will be provided later with reference to FIG. 6.

Other choices for modifying at least one indicator are also possible. The end tunneling device could change the protocol number (See FIG. 4, 376) to a protocol number (See FIG. 4, 376) other than the protocol number (See FIG. 4, 376) of the initial request 130, for example, if the initial request 130 is being forwarded from the point of the end tunneling device 120 over a network hop to a destination device 131 using a different protocol than the protocol being used between the originating device 108 (e.g., the requesting device) and the beginning tunneling device 110.

In step 318, the end tunneling device 120 forwards the initial request 130 towards a destination device 131. After the end tunneling device 120 has converted the tunneling request 120 into an initial request 130 (e.g., packets, messages, etc. to be transmitted using TCP/IP, UDP, RTP, and other protocols, etc.), the end tunneling device 120 can either process the initial request 130 (e.g., if the request is terminating at the end tunneling device 120) or forward the initial request 130 through the network 105 to the destination device 131. Further details of the invention will now be provided with reference to FIG. 4.

Figure 4:
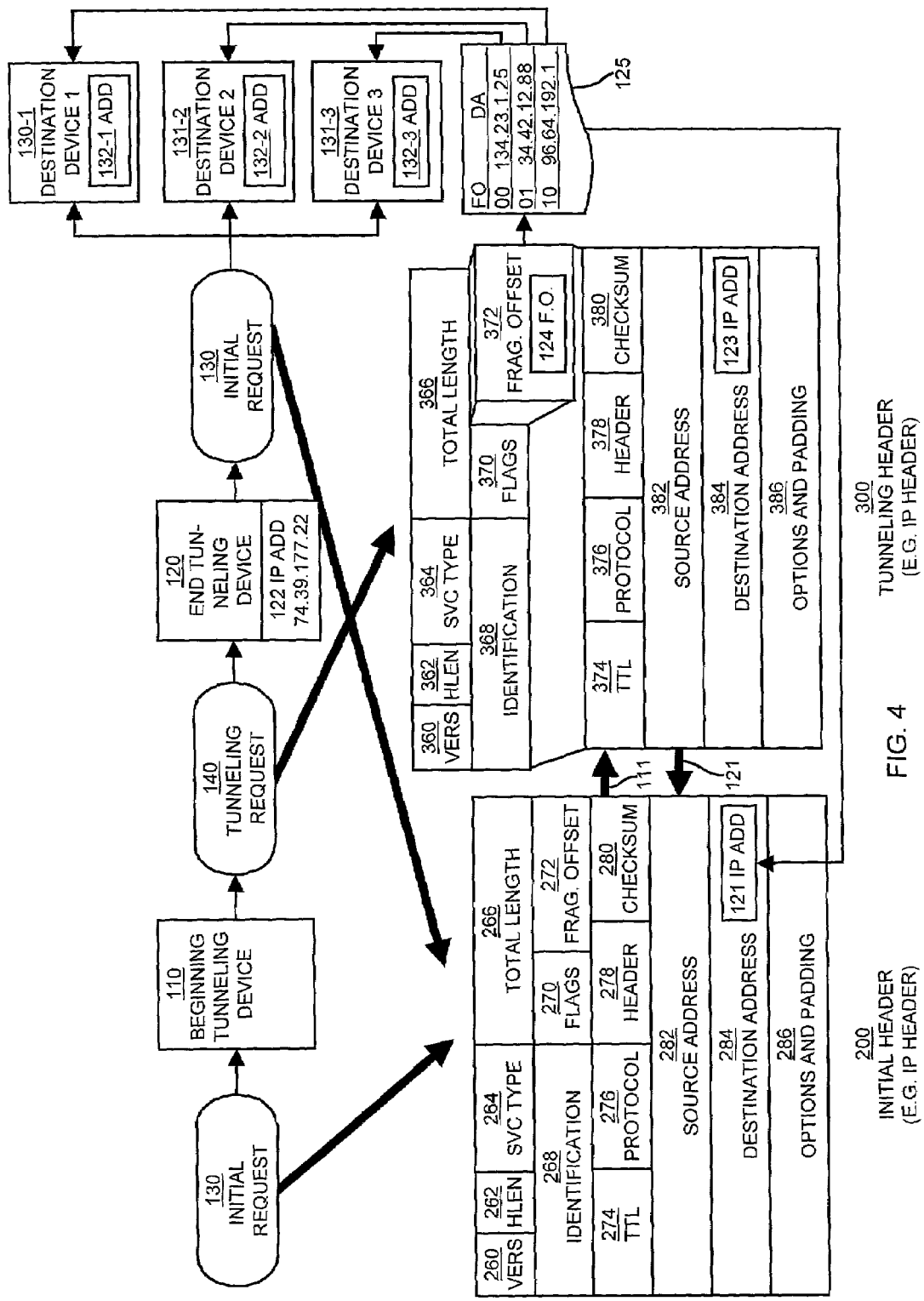
FIG. 4 is a depiction of the conversion an initial request into a tunneling request and in turn, from the tunneling request back to the initial request.

FIG. 4 is an example depiction of the conversion of an initial request 130 to a tunneling request 140 and, in turn, from a tunneling request 140 back to an initial request 130.

FIG. 4 includes an initial request 130, a beginning tunneling device 110, a tunneling request 140, an end tunneling device 120 with an IP address 122, a later initial request 130 and three destination devices 131-1, 131-2, 131-3, each showing destination device addresses 132-1, 132-2, 132-3, respectively. The destination devices 131-1, 131-2, 131-3, and destination device addresses 132-1, 132-2, 132-3 will hereafter be collectively referred to as 131 and 132, respectively.

FIG. 4 also shows an initial header 200 (e.g., IP, UDP or other header, etc.) and a tunneling header 300. The headers 200 and 300 respectively include a version number field 260, 360, a header length field 262, 362, a service type field 264, 364, a total length field 266, 366, an identification field 268, 368, a flag field 270, 370, a fragment offset field 272, 372 (wherein the fragment offset field 372 of the tunneling header 300 includes a fragment offset number 124), a time-to-live field 274, 374, a protocol field 276, 376, a header checksum field 278, 378, a source address 282, 382, the destination address to 284, 384, (the destination address field of the initial header 200 contains a destination address 121; the destination address field of the tunneling header contains an end tunneling address 123) and options and padding field 286, 386. The fields are exemplary of fields that might exist within an IP header, by way of example.

As depicted in FIG. 4, the initial request 130 is detected by the beginning tunneling device 110 and identified as an initial request 130. The beginning tunneling device 110, in turn, converts the initial request 130 into a tunneling request 140, the details of which are shown in tunneling header 300. After receiving the tunneling request 140, the end tunneling device 120 converts the tunneling request 140 back into an initial request 130, the details of which are shown in the initial header 200. Further details of the invention and these conversion processes will now be provided with reference to FIGS. 5 and 6.

Figure 5:
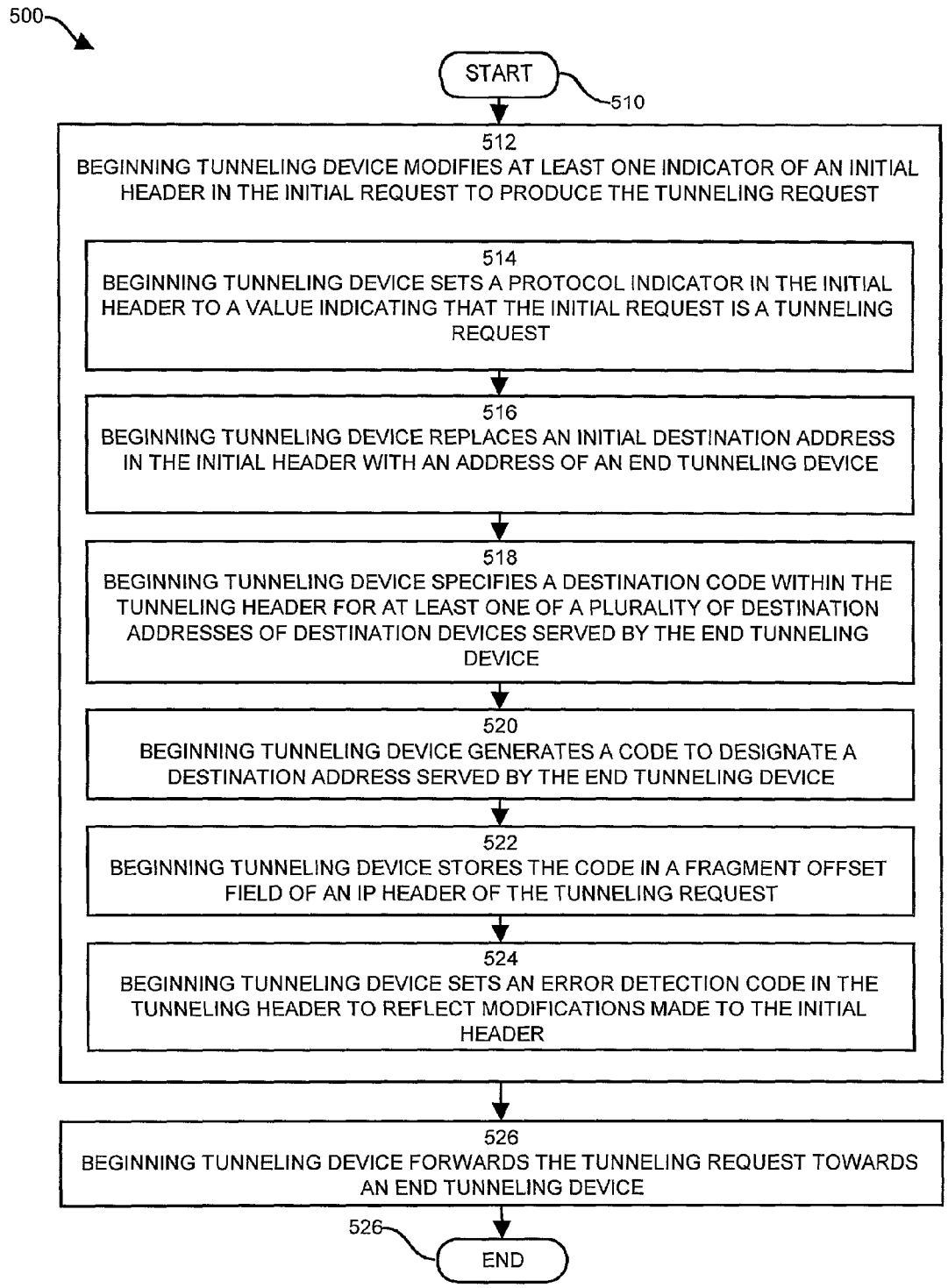
FIG. 5 is a flow chart of a procedure 500 performed by the beginning tunneling device as depicted in FIG. 1.

FIG. 5 is a continuation of a procedure performed by the beginning tunneling device 110 as depicted in FIG. 1 to modify the initial request 130 to a tunneling request 140.

In step 512, the beginning tunneling device 110 modifies at least one indicator (e.g., the protocol number 276 of the initial header 200, such as an IP header) in the initial request 130 to convert the initial request 130 into the tunneling request 140. One such indicator that can be used to identify a tunneling request is the protocol number 276. For example, the protocol number 276 used to represent the UDP protocol (User Datagram Protocol) is "17". In order to identify a tunneling header, a pre-assigned number representing a tunneling protocol would replace the UDP protocol number "17" in protocol field 376 of the tunneling header 300.

Other options for indicators of a tunneling request 140 are also possible. For example, the beginning tunneling device 110 could change or place information in other initial header 200 fields or within the data or payload to identify a tunneling request 140 in a similar manner as the information stored in the protocol number 276 field as described earlier.

In step 514, the beginning tunneling device 110 sets a protocol indicator (e.g., a value of the protocol number field 276) from the initial header 200 (e.g., of the initial request 130) to a value in the protocol field 376 in the tunneling request to indicate that the initial request 130 is a tunneling request 140. In this more particular case of changing an indicator, the protocol number 376 is used to indicate that the initial request 130 has become a tunneling request 140 (e.g., change the protocol number 6, which represents the TCP protocol, to another number designated for a tunneling protocol).

In step 516, the beginning tunneling device 110 replaces an initial address 121 (e.g., of the destination address field 284 which is the IP address 132 of the destination device 131) in the initial header 200 with an address 123 (e.g., of the destination address field 384 which is the IP address 122) of the end tunneling device 120 in the tunneling header 300.

Assume, as an example, that the destination device 131 is a server which collects information transmitted over the internet (e.g., network 105) from originating devices 108 (e.g., client devices) and that the originating devices 108 can send data through a beginning tunneling device 110 that serves as a collection point for data exchanged between the originating devices 108 and the server 131 and that also serves as a point to convert TCP/IP communications, data, messages, etc. into tunneled data, etc. before forwarding the data, etc. to the server 131. In the example, assume that the address of the end tunneling device 120 is IP address 74.39.177.22. In the example, the originating device 108 (e.g., a client) initiates a communication (e.g., an initial request 130) to the destination device 131 (e.g., server). In turn, the beginning tunneling device 110 receives the communications 130 (e.g., the initial request, sent in the form of a TCP/IP packet). The initial header 200 of the communication (e.g., the initial request 130) contains the destination address 284, for example, 134.23.1.25 which is the actual address 132 of a destination device 131.

After receiving the communications 130, the beginning tunneling device 110, among other things, replaces the destination address 134.23.1.25 (Field 121) with the address 122 of the end tunneling device 120, in this example, 74.39.177.22, as described above.

In step 518, the beginning tunneling device 110 specifies (e.g., determines) an indicator (e.g., the fragment offset field 372) within the tunneling header 300 to identify at least one of a plurality of destination addresses 132 of the destination devices 131 served by end tunneling device 120. For example, in one embodiment of the invention the beginning tunneling device 110 can use the fragment offset field 372 to store a code 124 that corresponds to the address 132 of a destination device 131. In another embodiment of the invention the destination code 124, is a reference code that can be used to identify the address of one or more destination devices 131, as further described in step 520.

In step 520, the beginning tunneling device 110 generates the destination code 124 that can be used to reference the destination addresses 132 of one or more possible destination devices 131. For example, the beginning tunneling device 110 may generate a binary code 124 (e.g., 0000, 0001, 0010, or 0011, etc., where the destination code represents one destination address of a set of possible alternatives, such as, for example, IP address 34.42.12.88, the IP address 132 of a desired destination device 131) In other words, one of the destination codes 0000, 0001, 0010, 0011, etc would be used to indirectly reference, the destination address 132 which is the address of a desired destination device 131.

The translation of such destination codes 124 into destination addresses 132, as described above, can be accomplished in any of a number of different ways. For example, the correlation of reference codes 124 to destination addresses 132 may be conducted using a system whereby the destination codes 124 and related destination addresses 132 are universally known to all devices (e.g., beginning tunneling devices 110, end tunneling devices 120, etc.) in advance of transmission of the initial request 130, such as by maintaining tables 125 on all such devices. In another alternative, originating devices 108 and/or beginning tunneling devices 110 and end tunneling devices 120 could maintain independent communications, either in the form of a separate communication or over an independent communications channel, with a device maintaining a table 125, in order to accomplish the correlation of destination codes 124 to destination addresses 132. Other methods may be used for correlating reference codes 124 to destination addresses 131 as may be known by individuals of ordinary skilled in the art.

In step 522, the beginning tunneling device 110 stores the destination code 124 in a fragment offset field 372 of an IP header 300 of the tunneling request 140. It would be possible to store the destination code 124 in other fields, as well, such as, for example, in the options and padding field 286 or other locations.

In step 524 the beginning tunneling device 110 sets (e.g., recalculates) an error correction code 378 in the tunneling header 300 (e.g., in an IP header) to reflect the modifications made to the initial header 200 (e.g., the values of certain fields of the IP header etc.). An example of an error correction code 378 is a checksum value, which is used, for example, in an IP header.

In step 526, the beginning tunneling device 110 forwards the tunneling request 140 towards an end tunneling device 120 (note that the address of the end tunneling device 120 is now stored in the destination address 384 in the tunneling header 300 of the tunneling request 140 in order to provide the information needed by the network 105 for routing of the tunneling request 140 to the end tunneling device 120).

Figure 6:
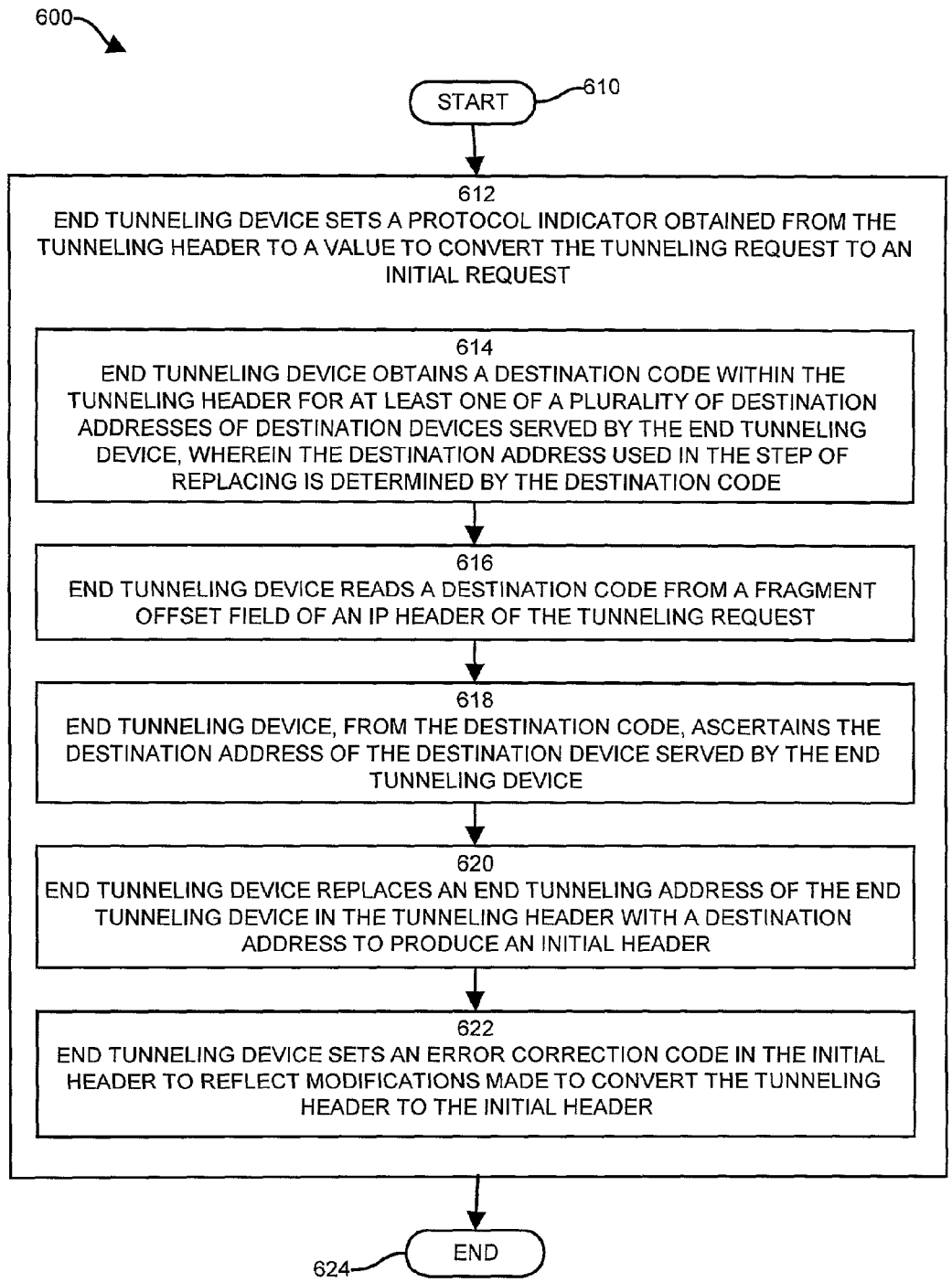
FIG. 6 is a flow chart of a procedure 600 performed by the end tunneling device as depicted in FIG. 1.

FIG. 6 is a flow chart of a procedure performed by the end tunneling device 130 to "untunnel" a tunneling request 140.

In step 612, the end tunneling device 120 sets a protocol indicator 376 obtained from the tunneling header 300 to a value to convert the tunneling request 140 back to an initial request 130 (e.g., a value indicating a protocol to be used for the network 105 hop between the end tunneling device 120 and the destination device 131, such as, for example, 6 for the TCP protocol). At some time after the tunneling request 140 has been converted back to the initial request 130, the tunneling device 120 will forward the initial request 130 to a destination device 131.

In step 614, the end tunneling device 120 obtains or otherwise determines the location of a destination code 124 within the tunneling header 300 that identifies at least one of a plurality of destination addresses 132 of the destination devices 131 served by the end tunneling device 120.

In step 616, the end tunneling device 120 reads the destination code 124 from a fragment offset field 372 of a tunneling header 300 of the tunneling request 140. The end tunneling device 140 uses the destination code 124, which was originally generated by the beginning tunneling device 110 and entered into the fragment offset field 372 of the tunneling header 300 to obtain or determine the destination address 132 of the initial request 130.

A variety of methods are possible for converting destination codes 124 to actual destination addresses 132, just as the previously explained methods for converting destination addresses 132 to destination codes 124, as described earlier. These may include the maintenance of a table 125 by the end tunneling device 120, which may be kept in coordination with a parallel table maintained on an originating device 108 and/or a beginning tunneling device 110. The correlation between destination codes 124 and destination addresses 132 may be accomplished by communication between the end tunneling device 132 and another source of such information such as the originating device 108 or the beginning tunneling device 110 or even a totally independent location. Other methods for correlation of destination codes 124 and destination addresses 132, are also possible as may be known by individuals of average skill in the art.

In step 618 the end tunneling device 120, from the destination code 124 ascertains the destination address 132 of the destination device 131 served by the end tunneling device 120.

In step 620, the end tunneling device 120 replaces an end tunneling address 122 of the end tunneling device 120, stored as an IP address 123 in the destination field 384 of the tunneling header 300 of the tunneling request 140 with the destination address 132 of the destination device 131 to produce an initial header 200. As such, the end tunneling device 120 returns the value of the destination address field 284 from the address of the end tunneling device 122 back to the destination address 132 of the appropriate destination device 131 which was originally identified in the initial request 200. In the example described earlier, that value would be the IP address 134.23.1.25, replacing the end tunneling destination address 122, which in the example above, was 74.39.177.22. As such, the value returned to the destination address field 284 of the initial header 200 can be used by the end tunneling device 200 as well as other devices in the network 105 to forward the initial request 130 (e.g., which was converted from a tunneling request 140, back to an initial request 130) over the network 105 to the destination device 131. In other embodiments of the invention, the end tunneling device 120 may be configured to replace the IP address in the destination address field 384, with an address of other than the address 132 of the destination device 131, for example, the address of another intermediate network 105 node as might be useful in multi-hop network 105 transmissions. In such a case, a destination device 130 serves as an intermediate node rather than the ultimate destination.

It should be understood that FIGS. 1 and 4 show three destination devices 131 for the sake of simplicity and ease of understanding but that fewer or more destination devices are also possible.

The end tunneling device 140 thus replaces the end tunneling device 120 address 122, stored in the destination address field 384 of the tunneling header 300 of the tunneling request 140 with the destination address 132 of the destination device 131 in what is again, the initial header 200.

In step 622, the end tunneling device 120 sets an error correction code 278 in the initial header 200 to reflect modifications made to convert the tunneling header 300 to the initial header 200. In the example of a TCP/IP initial request 130, this is the checksum value stored in the header checksum field 278. Other communications protocols may also use error correction codes 278, as well.

In turn, the end tunneling device 120 then forwards the initial request 130 over the network 105 using the destination address 131, now stored in the destination address field 284 of the initial header 200. Other network 105 devices will also use the destination address 384, as well, to transmit the initial request 130 along its designated network 105 path.

Figure 7:
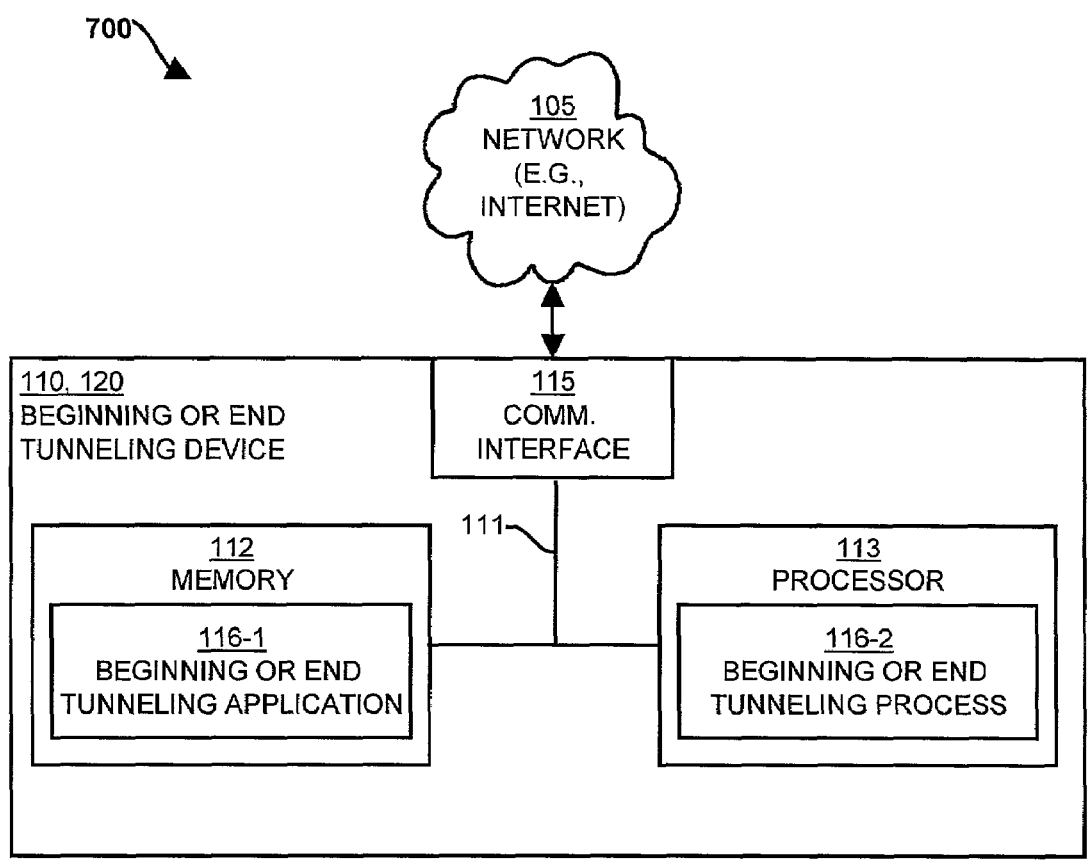
FIG. 7 shows an embodiment of the invention in which a beginning or end tunneling device 101, 120 is implemented using a general purpose computer 700.

Further details of the invention will now be provided with reference to FIG. 7.

FIG. 7 shows an embodiment of the invention in which a beginning or end tunneling device 110, 120 is implemented using a general purpose computer 700. The beginning or end tunneling device 110, 120 includes an interconnection mechanism 111 (e.g., a data bus and/or circuitry) which couples a communications interface 115 (e.g., modem or other network interface), a memory 112 (e.g., any computer readable medium such as a random access memory (RAM) and/or read only memory (ROM) or even disk or storage medium) having a beginning or end tunneling application 116-1, and a processor 113 (microprocessor or other central processing unit) with a beginning or end tunneling process 116-2. The beginning tunneling device 110, 120 may be any type of computerized device or system such as a personal computer, workstation, server, networked system, or lager mainframe system, etc. In some cases, the beginning or end tunneling device 110 may be a router, switch, or other network device, etc. The communications interface 115 allows either the beginning or end tunneling device 110, 120 to communicate with the other beginning or end tunneling device or devices 110, 120, the originating device or devices 108, and/or destination device or devices 131 via the network 105. The general purpose computer embodiment of the invention performs the same procedures as described in more detail with respect to FIGS. 1-6.

The features of the invention, as described above, may be employed in data communications devices and other computerized devices such as those manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a beginning tunneling device, a method of communication comprising the steps of:
   detecting an initial request at the beginning tunneling device;
   identifying the initial request as a candidate to be converted to a tunneling request wherein the identifying further comprises at least one of detecting that a destination address in the initial request is for a destination device associated with an end tunneling device, identifying any initial request received that has a particular source address as being designated to become a tunneling request, and interpreting information from an initial header in order to identify that the initial request is intended to be a tunneling request;
   modifying at least one indicator of an initial header in the initial request to convert the initial request into the tunneling request, said modifying including specifying a destination code within a tunneling header for at least one of a plurality of destination addresses of destination devices served by an end tunneling device;
   wherein the initial request received by the beginning tunneling device is in the format of a TCP/IP protocol and wherein the specifying comprises steps of: generating a destination code to designate a destination address served by the end tunneling device; and storing the destination code in a fragment offset field of an IP header of the tunneling request;
   said modifying further includes setting an error correction code in the tunneling header to reflect modifications made to convert the initial header to the tunneling header and forwarding the tunneling request towards the end tunneling device.

2. The method of claim 1 wherein the step of modifying comprises the step of:
   setting a protocol indicator in the initial header to a value indicating that the initial request is a tunneling request.

3. The method of claim 1 wherein the step of modifying comprises the step of:
   replacing a destination address of a destination device in the initial header with an end tunneling address of an end tunneling device to produce a tunneling header.

4. The method of claim 1 wherein the initial request received by the beginning tunneling device is in the format of a TCP/IP protocol and wherein the step of modifying comprises the step of:
   setting a protocol indicator in the initial header to a value indicating that the initial request is a tunneling request.

5. The method of claim 1 wherein the initial request and the tunneling request are the same size.

6. The method of claim 5 wherein the initial request and the tunneling request include respective initial headers and tunneling headers of the same size.

7. The method of claim 1 wherein the initial request is a full initial request and wherein the full initial request can be fully converted into a single tunneling request.

8. In an end tunneling device, a method of communication comprises steps of:
  detecting a tunneling request;
  identifying the tunneling request as a candidate to be converted to an initial request;
  modifying at least one indicator of a tunneling header in the tunneling request to convert the tunneling request into the initial request;
  said modifying including obtaining a destination code within the tunneling header for at least one of a plurality of destination addresses of destination devices served by the end tunneling device;
    wherein the tunneling request received by the end tunneling device is in the format of a TCP/IP protocol and wherein the obtaining comprises steps of: reading a destination code from a fragment offset filed of an IP header of the tunneling request; and from the destination code, ascertaining the destination address served by the end tunneling device;
    replacing an end tunneling address of the end tunneling device in the tunneling header with the destination address to produce an initial header;
    said modifying further includes setting an error correction code in the initial header to reflect modifications made to convert tunneling header to the initial header; forwarding the initial request toward a destination device.

9. The method of claim 8 wherein the step of modifying comprises the step of:
  setting a protocol indicator obtained from the tunneling header to a value to convert the tunneling request to an initial request.

10. The method of claim 8 wherein the tunneling request received by the end tunneling device is in the format of a TCP/IP protocol and wherein the step of modifying comprises the steps of:
  setting a protocol indicator obtained from the tunneling header to a value to convert the tunneling request to an initial request.

11. A beginning tunneling device for processing initial requests comprising:
  a memory;
  a communications interface;
  a processor; and
  an interconnection mechanism coupling the memory, the processor and the communications interface;
  wherein the processor is configured to:
    detect an initial request at the beginning tunneling device; identify the initial request as a candidate to be converted to a tunneling request, wherein the identifying further comprises at least one of detecting that a destination address in the initial request is for a destination device associated with an end tunneling device, identifying any initial request received that has a particular source address as being designated to become a tunneling request, and interpreting information from an initial header in order to identify that the initial request is intended to be a tunneling request;
    modifying at least one indicator of an initial header in the initial request to convert the initial request into the tunneling request, said modifying including specifying a destination code within a tunneling header for at least one of a plurality of destination addresses of destination devices served by an end tunneling device;
    wherein the initial request received by the beginning tunneling device is in the format of a TCP/IP protocol and wherein the specifying comprises steps of: generating a destination code to designate a destination address served by the end tunneling device; and storing the destination code in a fragment offset field of an IP header of the tunneling request;
    said modifying further includes setting an error correction code in the tunneling header to reflect modifications made to convert the initial header to the tunneling header and forwarding the tunneling request towards the end tunneling device.

12. The beginning tunneling device of claim 11 wherein, to modify at least one indicator, the beginning tunneling device is configured to:
  set a protocol indicator in the initial header to a value indicating that the initial request is a tunneling request.

13. The beginning tunneling device of claim 11 wherein, to modify at least one indicator, the beginning tunneling device is configured to:
  replace a destination address of a destination device in the initial header with an end tunneling address of an end tunneling device to produce a tunneling header.

14. The beginning tunneling device of claim 11 wherein the initial request received by the beginning tunneling device is in the format of a TCP/IP protocol and wherein, to modify at least one indicator, the beginning tunneling device is configured to:
  set a protocol indicator in the initial header to a value indicating that the initial request is a tunneling request.

15. The beginning tunneling device of claim 11 wherein the initial request and the tunneling request are the same size.

16. The beginning tunneling device of claim 15 wherein the initial request and the tunneling request include respective initial headers and tunneling headers of the same size.

17. The beginning tunneling device of claim 11 wherein the initial request is a full initial request and wherein the full initial request can be fully converted into a single tunneling request.

18. An end tunneling device for processing tunneling requests comprising:
  a memory;
  a communications interface;
  a processor; and
  an interconnection mechanism coupling the memory, the processor and the communications interface;
  wherein the processor is configured to:
    detecting a tunneling request;
    identifying the tunneling request as a candidate to be converted to an initial request;
    modifying at least one indicator of a tunneling header in the tunneling request to convert the tunneling request into the initial request;
    said modifying including obtaining a destination code within the tunneling header for at least one of a plurality of destination addresses of destination devices served by the end tunneling device;
    wherein the tunneling request received by the end tunneling device is in the format of a TCP/IP protocol and wherein the obtaining comprises steps of: reading a destination code from a fragment offset filed of an IP header of the tunneling request; and from the destination code, ascertaining the destination address served by the end tunneling device;
    replacing an end tunneling address of the end tunneling device in the tunneling header with the destination address to produce an initial header;

said modifying further includes setting an error correction code in the initial header to reflect modifications made to convert tunneling header to the initial header;

forwarding the initial request toward a destination device.

19. The end tunneling device of claim 18 wherein, to modify the at least one indicator, the end tunneling device is configured to:

set a protocol indicator obtained from the tunneling header to a value to convert the tunneling request to an initial request.

20. The end tunneling device of claim 18 wherein the tunneling request received by the end tunneling device is in the format of a TCP/IP protocol and wherein, to modify the at least one indicator, the end tunneling device is configured to:

set a protocol indicator obtained from the tunneling header to a value to convert the tunneling request to an initial request.

21. A computer program product that includes a computer readable medium having instructions stored thereon for conducting communications such that the instructions, when carried out by the computer, cause the computer to perform the steps of:

detecting an initial request;

identifying the initial request as a candidate to be converted to a tunneling request, wherein the identifying further comprises at least one of detecting that a destination address in the initial request is for a destination device associated with an end tunneling device, identifying any initial request received that has a particular source address as being designated to become a tunneling request, and interpreting information from an initial header in order to identify that the initial request is intended to be a tunneling request;

modifying at least one indicator of an initial header in the initial request to convert the initial request into the tunneling request, said modifying including specifying a destination code within a tunneling header for at least one of a plurality of destination addresses of destination devices served by an end tunneling device;

wherein the initial request received by the beginning tunneling device is in the format of a TCP/IP protocol and wherein the specifying comprises steps of: generating a destination code to designate a destination address served by the end tunneling device; and storing the destination code in a fragment offset field of an IP header of the tunneling request;

said modifying further includes setting an error correction code in the tunneling header to reflect modifications made to convert the initial header to the tunneling header and forwarding the tunneling request towards the end tunneling device.

22. A beginning tunneling device, for processing initial requests comprising:

a memory;

a communications interface;

a processor;

an interconnection mechanism coupling the memory, the processor and the communications interface;

means, coupled to the communications interface, for detecting an initial request;

means, coupled to the communications interface, for identifying the initial request as a candidate to be converted to a tunneling request, wherein the means for identifying further comprises at least one of detecting that a destination address in the initial request is for a destination device associated with an end tunneling device, identifying any initial request received that has a particular source address as being designated to become a tunneling request, and interpreting information from an initial header in order to identify that the initial request is intended to be a tunneling request;

means, coupled to the communications interface, for modifying at least one indicator of an initial header in the initial request to convert the initial request in to the tunneling request, said modifying including specifying a destination code within a tunneling header for at least one of a plurality of destination addresses of destination devices served by an end tunneling device;

wherein the initial request received by the beginning tunneling device is in the format of a TCP/IP protocol and wherein the specifying comprises steps of: generating a destination code to designate a destination address served by the end tunneling device; and storing the destination code in a fragment offset field of an IP header of the tunneling request;

said modifying further includes setting an error correction code in the tunneling header to reflect modifications made to convert the initial header to the tunneling header and means coupled to the communication interface, for forwarding the tunneling request towards the end tunneling device.

23. The method of claim 1 further comprising modifying a payload of the initial request to convert the initial request to a tunneling request.

24. The method of claim 8 further comprising modifying a payload of the initial request to convert the initial request to a tunneling request.

* * * * *